Figure 1:
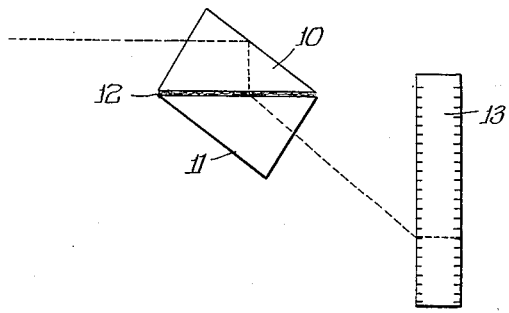

Dec. 22, 1936.　　　　F. J. CAHN ET AL　　　　2,065,114

METHOD OF ANALYSIS

Filed March 11, 1935

Inventors
Frank J. Cahn,
Albert K. Epstein,
By John J. McLaughlin atty.

Patented Dec. 22, 1936

2,065,114

UNITED STATES PATENT OFFICE 2,065,114

METHOD OF ANALYSIS

Frank J. Cahn and Albert K. Epstein, Chicago, Ill.; said Cahn assignor to said Epstein, Marvin C. Reynolds, and Benjamin R. Harris, Chicago, Ill., doing business as Epstein, Reynolds and Harris Application March 11, 1935, Serial No. 10,353

7 Claims. (Cl. 23—230)

Our invention relates to methods of analysis. It relates more in particular to an improved, rapid and accurate method for determining the percentage of total solids in liquid egg material.

In the industries in which eggs are processed or used, it is essential for many reasons to determine the percentage of solids in the liquid egg material. The egg meat of hen eggs consists of approximately one-third of yolk material and two-thirds of egg whites. The solid content of the egg white varies from 11½% to 12½%. The moisture content of the yolk material varies from 49% to 50%. The solid content of the total egg meat is on the average of 27% to 27½%.

In the egg freezing industry or in the egg drying industry, it is necessary many times to separate the yolk material from the whites and treat each product separately. If a larger proportion of egg white is left with the yolk, then the moisture content will be greater. If the yolks are separated from the whites very closely the moisture content will be less.

The solid material of egg white is composed of a mixture of various albuminous materials of a gelatinous-like nature, which vary in their viscosity and also in solid content. Thus a portion of the egg white is thick and jelly-like and another portion is thinner in consistency, and the two portions do not mix readily into a homogeneous mass. The solid part of the yolk material contains various proteins, lecithin and other fatty materials. For certain food industries, it is necessary to have a yolk material of a definite solid content. Thus yolk material appears on the market with a solid content varying from 40% to 46% of egg solids. The greater the amount of whites left with the yolk during separation, the larger will be the moisture content of the mixture and the smaller will be the solid content.

In certain industries, such as for example in the noodle industry, the food law prescribes a definite amount of egg solids in the finished products. It is therefore necessary for processors, as well as for users of the various egg products, to know definitely the solid content of the egg material. In the separation of yolks from whites it happens many times that, during the separation, the yolk membrane breaks and admixes with the whites and the content falls into a receptacle which contains either whites or yolks. In order to be able to make mixed eggs of a 27% egg solid content, it is necessary to know the solid content of the material so as to be able to determine how much yolk material must be added to bring it up to the desired solid content. Heretofore the moisture content was determined by the usual gravimetric method which consisted in evaporating the moisture from a given sample at desirable temperatures until the weight was approximately constant. This takes several hours and many times entails errors. In order to get reliable results, the solids must be dried to a constant weight, which is time consuming.

We have discovered a method by virtue of which the solid content of egg material may be determined in a relatively small period of time. Briefly speaking, this process consists in the following:

The egg material, such as yolk or varying mixtures of yolk and white, to be tested, is dispersed with a dispersing agent, such as a water soluble electrolyte, in sufficient proportion to get a refractive index which we have found has a relation to the solid content. If an attempt is made to take a refractive index directly without previously treating the egg material with a suitable dispersing agent, it is very difficult to get a reading on an instrument of the Abbe, Pulfrich or similar instruments because there is no sharp line of demarcation between the light and the dark field, when the egg material is placed in the instrument for observation.

The object of our invention is the provision of a process for determining the total solid content of egg material which can be carried on in a relatively very short length of time.

Another object is the provision of means for determining the percentage of solids in egg material accurately, dependably and rapidly.

Another object is the provision of a method of the character referred to which does not depend upon the separation of the solids and moisture content whereby there is never any problem as to whether or not extraction has been complete.

Another object is the provision of a process with a relatively small percentage of error with the provision of means for readily correcting the result for changed conditions.

We have found a means and method whereby the total solid content of liquid egg material may be determined by measuring the refractive index thereof. The refractive index by suitable tables, or by utilizing a specially prepared scale, may be translated into terms of percentage of solids accurately and quickly.

We have discovered that by the addition to the egg material of suitable types of substances, the refractive index can be measured and the total solids in the egg material determined accurately.

We first treat the liquid egg material to disperse the egg solids and to produce an optically homogeneous product, that is, a product which will pass light so that it will produce a sharp line when examined in a refractometer. We secure this result by utilizing a proper concentration of a substance having a solvent or dispersing action upon the liquid egg material such that the solid portions thereof are optically homogeneously "dissolved". The liquid egg material tested may be normal liquid egg meat such as whole eggs or yolks or varying mixtures of yolk and whites, or egg material treated with usual types of addition substances, such as salt, sugar, glycerine, organic acids, or mixtures of these substances.

We have found that a relatively large number of substances will produce the effect desired. Suitable water soluble electrolytes in sufficient concentration may be employed such as sodium chloride, calcium chloride, sodium nitrate, ammonium chloride, ammonium nitrate, and other substantially neutral salts. Some alkaline substances may also be employed including alkaline salts. Among the substances which we have employed satisfactorily are sodium acetate, ammonium acetate, sodium bicarbonate, ammonium bicarbonate, ammonia (28%), primary potassium phosphate solution ($KH_2PO_4$), potassium iodide, sodium sulphate, potassium sodium tartrate, 0.16 normal sodium hydroxide and sodium thiocyanate, besides the chloride salts previously referred to; electrolytes such as salts of heavy metals, lead, mercury, which precipitate protein cannot be used. Aluminum sulphate is not suitable for the purpose.

The concentration and type of water soluble substances employed should be such that flocculation of any matter in the egg material does not occur upon the addition of such material to the egg material preparatory to testing. This depends upon the nature of cation and anion. Thus smaller concentrations of sodium sulphate will be necessary to precipitate a globuling protein than sodium chloride or sodium nitrate. For practical purposes, it is advisable to employ only a single type of substance and we have found the most suitable and convenient substances to employ for the purpose to be ordinary sodium chloride. The invention will be described, therefore, with particular reference to the use of sodium chloride for optically homogeneously "dissolving" the solid portions of the egg material.

Figure 2:
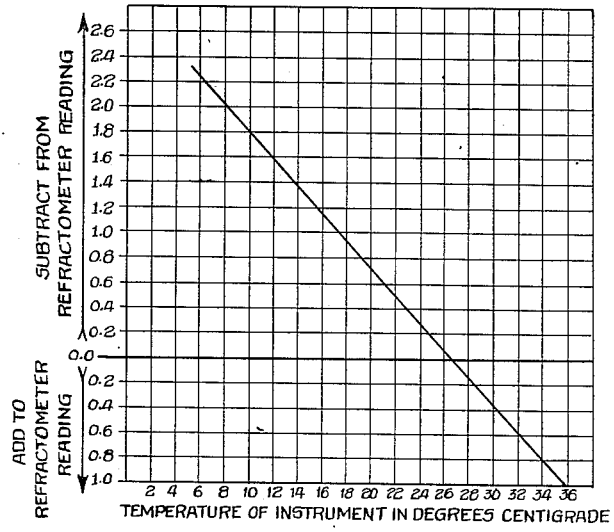
Figure 3:
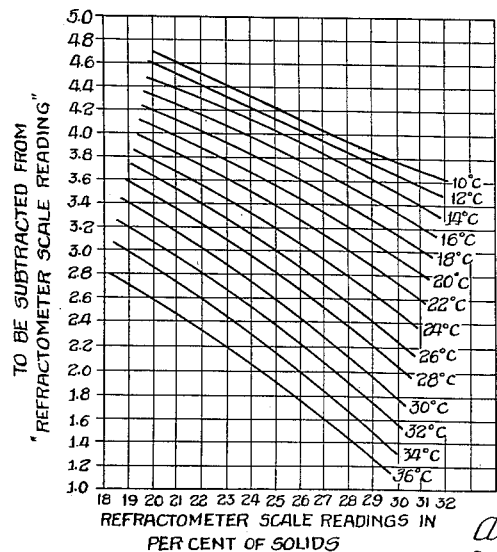

For the convenience of those skilled in the art, we have illustrated certain features of our invention in the accompanying drawing wherein Fig. 1 is a schematic view showing the arrangement of a suitable refractometer, and Figs. 2 and 3 are charts illustrating one manner in which corrections for temperature and the like may be made.

In the description of the manner of carrying out our invention, we shall describe the use of salt for optically homogenizing the liquid egg product according to certain practical embodiments thereof. To one hundred volume parts of the meat content of hen eggs, we add five volume parts of a saturated salt solution and stir well to disperse the salt uniformly throughout the liquid egg material. We then take this liquid egg product which has been rendered optically homogeneous by the addition of salt, and place a small quantity thereof between prisms 10 and 11 of a refractometer. The liquid egg material is indicated by the character 12 in Fig. 1, it being understood that in actual practice the layer of egg material between the prisms is somewhat thinner. In actual practice, we find that an Abbe type of refractometer can be used with very great satisfaction, and a Pulfrich refractometer is also satisfactory. In general, however, any type of refractometer may be employed as long as suitable provision can be made to pass the light through the egg material in such a way as to obtain a refractive index reading. The light from a suitable source passes through the prisms and egg material in the general direction indicated by the dotted lines in Fig. 1 and a light image is projected onto a suitable scale 13, which may be a ground glass plate to facilitate reading. The usual type of image is obtained, there being a sharp line dividing a brighter portion of the image from a shadowed portion, this sharp line being the point at which the refractive index is read. The scale may be calibrated to read only the refractive index, or it may be calibrated to read both the refractive index and the percent of solids in the egg material, or even the percentage of solids only.

One advantage of the present method is that it is not necessary to employ standard temperature conditions in obtaining a suitable reading. We show in Fig. 3 a correction chart standardized for use in the particular embodiment of the invention referred to in preceding paragraphs. This particular embodiment is very suitable for testing egg materials consisting of a mixture of egg whites and yolk, and in which the egg material contains between approximately 18 to 32 percent of egg solids. It is not limited, however, to this use. The chart, however, shows corrections only in the case where the solids are between 18 and 32 percent. Charts may be prepared for egg materials which contain larger proportions of yolk than whites, such as for example a solid content varying between 38 to 46% egg solid content. A chart may also be prepared for egg material with varying amount of egg solids to which is added a constant amount of salt, sugar or glycerine as an addition agent.

Most refractometers of the Abbe and Pulfrich type have an index of refraction scale and a corresponding scale to read the percentages of sucrose in a solution corresponding to a given refractive index. We have discovered that when 10% of salt is added to yolk material or commercial yolk of a solid content varying between 43% to 46% of egg solids, the refractive index of such yolk mixture is equivalent to the refractive index of a sucrose solution of a similar amount of total solid content at 27° C., and therefore the percentage of total solids of the egg mixture may be read off directly from the sugar scale present in the instrument.

According to the Epstein Patent No. 1,730,879, a commercial product has been placed on the market which is prepared from yolk material containing approximately 44.5% to 45% of solids, with the addition of 10% of salt. In order to determine the solid content of the mixture, a portion of this material is placed on the prism of the refractometer and the total percent of solids is read directly on the sugar scale. The chart No. 2 shows the temperature correction of readings deviating from about 27° C. Thus for example if the reading on the instrument shows 50.3 and the temperatute is 25° C., then .2% is subtracted from the reading, which means that the yolk material has a solid content of 50.1%. The variation of the salt content within .2% plus or minus will not result in readings with any appreciable error from a practical standpoint. For yolk products of lower egg content, charts may be prepared in the same manner as chart No. 3.

Referring now to the chart (Fig. 3), the various total solids expressed in terms of percentages found by direct reading of the scale of the refractometer or by converting the refractive index reading into terms of percent of solids, are plotted as abscissae, while figures to be subtracted from the percentage value obtained are plotted as ordinates. There are a number of curves, each for a different temperature for determining the correction to be made at that temperature when a given value is initially obtained.

As an example, let us assume that the temperature was found to be 24° C. at time of reading and the refractive index reading showed the egg material to contain 28% of total solids. The curve on chart No. 3 with the legend 24° C. intercepts the ordinate and abscissa lines at a point corresponding to abscissa 28, ordinate 2.8, the former indicating the actual reading, and the latter the number to be subtracted to obtain the exact percentage of solids.

We now subtract 2.8 from 28 and have a final value of 25.2, which is an accurate determination of the total percentage of solids present; in other words, a true determination of the total solid content of the unsalted material.

It will be understood that in making the original determinations, the total solid content of the egg material must be determined by standard methods such as, for example, drying the liquid material thoroughly and weighing the dry residue. By taking a product of known solid content, treating it to make it optically homogeneous by dispersing the egg material and then determining the refractive index, a relation is provided by means of which subsequent determinations can be made entirely by means of a refractometer.

According to another example of carrying out the invention, egg material consisting essentially of egg yolks is treated by the addition of 10% of salt to produce a product as described in Epstein Patent No. 1,730,879. Having previously made determinations by standard analytical methods of the percentage of total solids in products containing, say 10% of salt, and making at the same time readings of refractive indices, a relationship is established which permits the operator thereafter to read the refractive index and determine immediately either by direct reading from the scale, or by means of tables, the true solid content. Fig. 2 shows a curve for correction of readings for egg material consisting of substantially egg yolks and 10% sodium chloride. Temperatures are plotted as abscissae, with corrections therefor as ordinates as relatively small numbers which are either added to or subtracted from the actual reading according to the instructions appearing at the left of the chart.

It is obvious that by means of our method, very quick and accurate determinations of total solids can be made in a few minutes. This method is very advantageous for process control work, to assist packers of egg materials in determining the character of the product manufactured, and purchasers to determine the character of the material purchased, and for many other purposes in all industries where egg materials are packed or employed.

By the term "liquid egg material" as heretofore employed and as used in the claims, it will be understood to cover egg material with its normal moisture content as removed from the shell or egg material containing a sufficient amount of moisture to enable refractometer readings to be obtained which will correctly reflect the total solid content of said egg material.

What we claim as new and desire to protect by Letters Patent of the United States is:

1. The method of determining the total solids of liquid egg material which comprises adding to said egg material a sufficient amount of sodium chloride to make said liquid egg material optically homogeneous and then determining the refractive index thereof.

2. The method of determining the total solid content of liquid egg yolk or commercial egg yolk which comprises adding approximately 10% of sodium chloride thereto and mixing the same therewith to render the product optically homogeneous, and then measuring the index of refraction thereof whereby the total solid content may be readily determined.

3. The method of determining the total solid content of liquid egg meats which comprises admixing sodium chloride therewith in the proportion of approximately one hundred volume parts of egg meats to approximately five volume parts of a saturated solution of sodium chloride to render the product optically homogeneous, and then determining the refractive index thereof.

4. The method of determining the total solid content of liquid egg material which comprises adding thereto a water-soluble electrolyte having the property of dispersing egg proteins, said electrolyte being employed in an amount sufficient to disperse egg protens and insufficient to precipitate the same, whereby the liquid egg material is rendered optically homogeneous, and thereafter determining the refractive index thereof.

5. The method of determining the total solid content of liquid egg material which comprises adding thereto a water-soluble crystalline salt having the property of dispersing egg proteins, said salt being employed in an amount sufficient to disperse egg proteins and insufficient to precipitate the same, whereby the liquid egg material is rendered optically homogeneous, and thereafter determining the refractive index thereof.

6. The method of determining the total solid content of liquid egg material which comprises adding thereto a substantially neutral, crystalline water-soluble electrolyte having the property of dispersing egg proteins, said electrolyte being employed in an amount sufficient to disperse egg proteins and insufficient to precipitate the same, whereby the liquid egg material is rendered optically homogeneous, and thereafter determining the refractive index thereof.

7. The method of determining the total solid content of liquid egg material which comprises adding thereto a compound of the class consisting of sodium chloride, calcium chloride, sodium nitrate, ammonium chloride, ammonium nitrate, sodium acetate, ammonium acetate, sodium bicarbonate, ammonium bicarbonate, ammonia (28%), primary potassium phosphate solution, potassium iodide, sodium sulphate, potassium sodium tartrate, 0.16 normal sodium hydroxide and sodium thiocyanate, said compound being employed in an amount sufficient to disperse egg proteins and insufficient to precipitate the same, whereby the liquid egg material is rendered optically homogeneous, and thereafter determining the refractive index thereof.

FRANK J. CAHN.
ALBERT K. EPSTEIN